Feb. 18, 1941.  E. G. JONES  2,232,005
PLANT PROTECTOR
Filed July 22, 1940
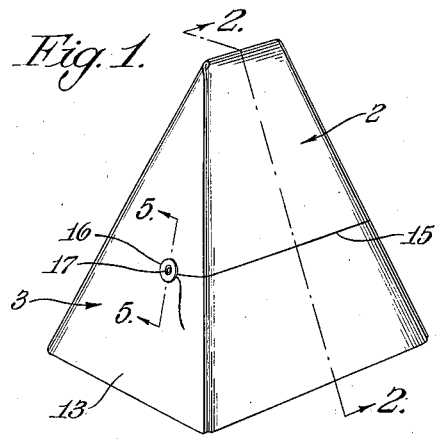
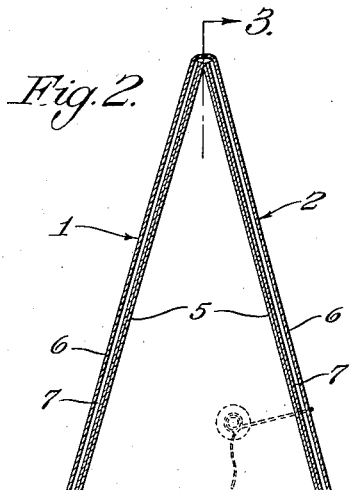
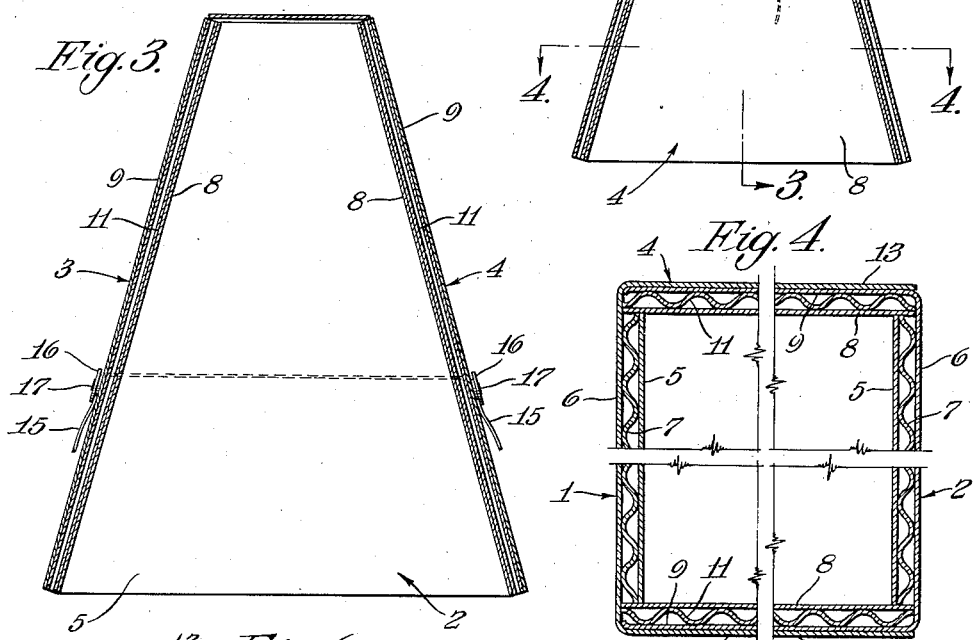
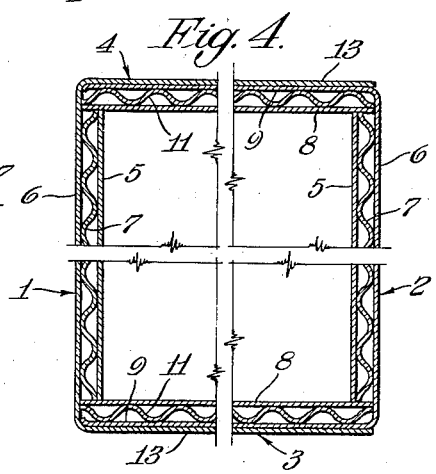
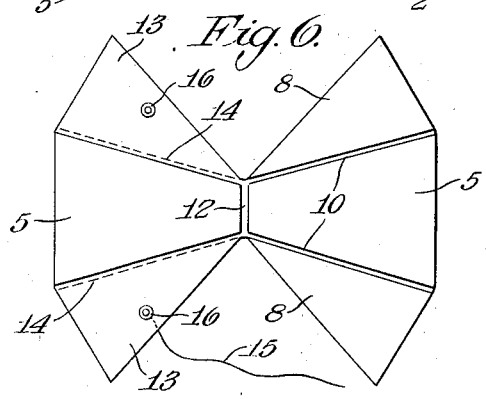
Edward G. Jones.
INVENTOR
BY *Victor J. Evans & Co.*
ATTORNEYS Patented Feb. 18, 1941

2,232,005

UNITED STATES PATENT OFFICE 2,232,005

PLANT PROTECTOR

Edward G. Jones, Umatilla, Fla.

Application July 22, 1940, Serial No. 346,858

3 Claims. (Cl. 47—28)

This invention relates to plant protectors, and its general object is to provide a protector in the form of a closed housing for completely covering young plants to protect the same from insects and the like, and inclement weather, especially injurious cold and frost, as well as detrimental heat, in that the walls of the housing include spaced members providing a dead air space which acts as an insulating medium.

A further object is to provide a plant protector that not only includes spaced inner and outer wall members for the purpose set forth, but the walls are reinforced by intermediate corrugated wall portions fixed to and holding the inner and outer wall members spaced throughout the entire areas thereof.

Another object is to provide a plant protector that is made from a single blank of material shaped and readily foldable in housing formation, with means for holding the blank accordingly against collapsing or displacement of the walls.

A further object is to provide a plant protector that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view of the protector which forms the subject matter of the present invention, folded and secured in housing formation.

Figure 2 is a sectional view taken approximately on line 2—2 of Figure 1, looking in the direction of the arrows.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Figure 5 is a sectional view taken approximately on line 5—5 of Figure 1, looking in the direction of the arrows.

Figure 6 is a plan view of the blank from which my protector housing is made.

Referring to the drawing in detail, it will be noted that my protector is formed into a housing of substantially pyramidal shape from a single flat blank, as shown in Figure 6, and which is made from any material suitable for the purpose, but preferably from corrugated paper, to provide sloping front and rear walls 1 and 2, meeting at their upper ends, and sloping side walls 3 and 4, the front and rear walls being preferably of trapezoidal shape and have their narrow ends joined together, while the side walls are of triangular shape and joined to the inclined side edges of the front and rear walls, with the apexes thereof terminating at the ends of the joint of the front and rear walls.

The front and rear walls each include spaced inner and outer wall members 5 and 6 and an intermediate corrugated wall member 7, while the side walls each include inner and outer wall members 8 and 9, with the outer wall members 9 integral with or provided by a continuation of the outer wall member 6 of the rear wall 2, but the inner wall members 8 of the side walls have their inner edges spaced as at 10 from the side edges of the inner wall member 5 of the rear wall 2 to allow folding of the side walls against the side edges of the inner wall member 5 of the rear wall, and the spaced wall members 8 and 9 also have intermediate corrugated wall members 11 between the same, the members 7 and 11 being fixed to their wall members to hold the same in spaced relation to provide a dead air space throughout the entire area of the housing for insulating the same, as will be apparent. The corrugations of the wall members 7 and 11 preferably extend longitudinally thereof, as clearly shown in Figure 4.

The outer wall members or portions 6 of the front and rear walls are integral and joined together at their inner ends, but the inner wall members 5 have their inner ends spaced from each other as at 12, to allow folding of the front and rear walls toward each other for disposal in sloping relation.

The outer wall member 6 of the front wall 1 extends laterally of the inner wall member 5 thereof to provide flaps 13 of the same shape as the side wall members 8 and 9, and the flaps are foldable outwardly beyond their juncture with the outer wall member 6 or in other words on the fold line 14 to provide a space for receiving the outer edges of the wall members 8, 9 and 11 and for disposal about the outer sides of the outer wall member 9, with the result it will be seen that the blank can be readily folded to provide the housing, as clearly shown in Figure 1.

In order to hold the blank folded in housing formation, I provide a flexible element 15 such as a cord, for disposal about the rear wall 2 and which has its end portions received by buttons 16 riveted or otherwise secured to the flaps 13. The buttons in the form shown, are each made from a pair of disks disposed upon opposite sides of the flaps and fixed thereto by hollow rivets 17, the end portions of the cord being wrapped about the rivets between the flaps and the outer disks, as clearly shown in Figure 3.

From the above description and the disclosure in the drawing, it will be obvious that I have provided a plant protector made from a single blank of material folded into housing formation for disposal about a plant to completely enclose and cover the same, so that it will be amply protected against insects or the like, as well as destructive weather elements, and when the housing is placed about the plant, with the lower edge thereof inserted within the ground, it is held against casual removal or displacement and is capable of withstanding severe weather elements without collapsing or being blown away, due to its shape and the reinforcing means therefor.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A plant protector formed from a single blank of material to provide a housing comprising front, rear and side walls, said front and rear walls being of substantially trapezoidal shape and joined together at their narrow ends to provide the top of the housing, said side walls being of triangular shape and joined to the side edges of the front and rear walls with the apexes thereof terminating at the ends of the juncture of the front and rear walls, reinforcing means for the walls, and fastening means for holding the walls in housing formation.

2. A plant protector formed from a single blank of material to provide a housing comprising front, rear and side walls, said front and rear walls being of substantially trapezoidal shape and joined together at their narrow ends to form the top of the housing, said side walls being of triangular shape and joined to the side edges of the front and rear walls with the apexes thereof terminating at the ends of the juncture of the front and rear walls, each wall including spaced inner and outer wall members forming a dead air space between the same, a corrugated wall member between the inner and outer wall members for reinforcing the same, and fastening means for holding said walls in housing formation.

3. A plant protector formed from a single blank of material to provide a housing comprising front and rear walls of trapezoidal shape and side walls of triangular shape, each wall including spaced inner and outer wall members, the outer wall members of the front and rear walls being joined together at the narrow ends thereof to provide the top of the housing, the outer wall members of the side walls being joined to the side edges of the outer wall member of the rear wall, flaps joined to the side edges of the outer wall member of the front wall for overlapping engagement with the outer wall members of the side walls, corrugated wall members between the wall members of each wall for holding the same spaced to provide a dead air space between the same and for reinforcing said walls, buttons secured to the flaps, and a flexible element detachably connected to the buttons for holding the walls in housing formation.

EDWARD G. JONES.